United States Patent
Koyun

(10) Patent No.: US 9,314,038 B2
(45) Date of Patent: Apr. 19, 2016

(54) METHOD AND DEVICE FOR TREATING EGGS IN SHELLS

(75) Inventor: Ismail Koyun, Worms (DE)

(73) Assignee: Kobil Systems GmbH, Worms (DE)

( * ) Notice: Subject to any disclaimer, the term of this patent is extended or adjusted under 35 U.S.C. 154(b) by 941 days.

(21) Appl. No.: 13/379,924

(22) PCT Filed: Jun. 22, 2010

(86) PCT No.: PCT/EP2010/003741
§ 371 (c)(1),
(2), (4) Date: Jun. 14, 2012

(87) PCT Pub. No.: WO2010/149330
PCT Pub. Date: Dec. 29, 2010

(65) Prior Publication Data
US 2012/0258218 A1    Oct. 11, 2012

(30) Foreign Application Priority Data

Jun. 23, 2009  (DE) .......................... 10 2009 030 260
Oct. 30, 2009  (DE) .......................... 10 2009 051 414

(51) Int. Cl.
A23B 5/005    (2006.01)

(52) U.S. Cl.
CPC ..................................... *A23B 5/0052* (2013.01)

(58) Field of Classification Search
CPC ........ A23L 1/32; A23B 5/0052; A23B 5/005; A23B 5/01; A23B 5/06
See application file for complete search history.

(56) References Cited

U.S. PATENT DOCUMENTS

| | | | |
|---|---|---|---|
| 2,565,311 A * | 8/1951 | Koonz et al. .................. | 426/521 |
| 2,673,160 A | 3/1954 | Feeney et al. | |
| 4,808,425 A | 2/1989 | Swartzel et al. | |
| 4,957,759 A | 9/1990 | Swartzel et al. | |
| 5,589,211 A | 12/1996 | Cox et al. | |
| 5,939,118 A * | 8/1999 | Cox et al. ...................... | 426/298 |
| 5,993,886 A | 11/1999 | Polster | |
| 6,149,963 A * | 11/2000 | Cutler et al. .................. | 426/614 |
| 6,692,784 B2 * | 2/2004 | Davidson ...................... | 426/298 |
| 2002/0041921 A1 | 4/2002 | Davidson et al. | |
| 2007/0202224 A1 | 8/2007 | Erasmus et al. | |
| 2008/0145491 A1 * | 6/2008 | Braeken ....................... | 426/241 |

FOREIGN PATENT DOCUMENTS

| WO | WO-95/26636 | 10/1995 |
|---|---|---|
| WO | WO-99/33362 | 7/1999 |
| WO | WO-2005/102064 | 11/2005 |
| WO | WO-2009/132856 | 11/2009 |

* cited by examiner

*Primary Examiner* — Lien T Tran
*Assistant Examiner* — Hong T Yoo
(74) *Attorney, Agent, or Firm* — Jordan and Hamburg LLP

(57) ABSTRACT

The invention relates to a method and a device, by which eggs in shells are subjected to heat treatment using a liquid or gaseous or vaporous medium, wherein pasteurization is carried out at a temperature in a range from 70 to 75° C. The object of the invention is to destroy or temporarily render dormant harmful microorganisms that can be destroyed at low heat, and further harmful microorganisms and viruses that cannot be destroyed at low heat, wherein altering of the eggs and/or denaturation of the proteins thereof should be prevented. It is proposed to subject the eggs, prior to pasteurization, to a preheating step at a temperature of substantially 60° C., followed by shock-like cooling to 4° to 5° C., and to carry out pasteurization for a duration of between 12 to 18 seconds.

19 Claims, 5 Drawing Sheets

METHOD AND DEVICE FOR TREATING EGGS IN SHELLS

BACKGROUND OF THE INVENTION

The invention relates to a method and an apparatus for treating, and in particular preserving, eggs in their shells on the basis of pasteurization, treating eggs by pasteurization being known in food engineering.

It is known that a poultry egg, which has the most balanced nutritional values after mother's milk, becomes contaminated by secretions from the digestive and urinary system upon passage through the cloaca during laying, and bacteria can be found in the egg and on the eggshell, even in the upper region of the oviduct, as a result of the particular environment or region. The egg and the eggshell are therefore not sterile.

Destruction of microorganisms using heat is a method that has been known for a long time. However, differences in boiling points due to different altitudes above sea level, the use of inconsistent heat, and failure to maintain constant durations mean that only a plurality, or only a portion, of the organisms present in the egg are destroyed. Finally, the known methods or procedures can result in a fundamental change in the egg.

Of the foodstuffs that are subjected to heat treatment, milk is the one that is best known and most used. As is known, milk is not fundamentally changed by the use of pasteurization or the UHT method. Milk and eggs contain microorganisms and viruses that are minimally resistant to heat (such as *Salmonella*), and those that are heat-resistant due to the environment/region.

Scientific advances have led to descriptions of several diseases that were previously unknown. Advances continue to be made in this research. New techniques and very finely tuned shock methods are being developed for several of the harmful microorganisms and viruses mentioned in these descriptions. In cases in which the pasteurization method does not have an adequate effect, shock methods such as the UHT method are used and recommended.

SUMMARY OF THE INVENTION

The object of the process used in the method of the invention, and of the apparatus of the invention provided for implementation thereof, is to destroy or temporarily render dormant harmful microorganisms that can be destroyed at low heat (pasteurization), and further harmful microorganisms and viruses that cannot be destroyed at low heat, while preventing alteration of the eggs and/or denaturation of the proteins thereof. The method and the device should be suitable for treating eggs of any type, and in particular eggs used as food, or genoblast eggs which contain the nucleus of the fertilized egg cell. A further objective is that of ensuring that a predefined level and/or a predefined magnitude of at least log 7 be expected in terms of the quantity of microorganisms, and in particular *Salmonella* and bacteria, at which the microbial load does not endanger the health of a consumer. In fertilized eggs or genoblast eggs, damage to the embryo should be prevented and/or the egg should be purified of microbes and bacteria which disadvantageously negatively impact the energy required for hatching.

The porous or non-porous shell of the egg or eggs is treated under pressure, and without the addition of chemical means, using a natural heat technology (e.g. UHT technology). Heat-sensitive or heat-resistant microorganisms and viruses are thereby neutralized or the multiplication thereof is halted, first in the low temperature range and then in a high temperature range. If the eggs are to be used as food, they are subsequently coated in accordance with applicable legal regulations, and in particular the Food and Drug Act, preferably using food-grade paraffin or other approved organic substances, or they are packaged aseptically, in order to extend the shelf life. For genoblasts or genoblast eggs containing the nucleus and/or the fertilized egg cell, coating or aseptic packaging can be performed using other substances, or can be omitted.

It is expressly pointed out that the description provided above and the descriptions of the method provided in the following also apply analogously to the device according to the invention.

The method includes the use of UHT (ultra-high temperature), in which the functionality of the egg is protected while, at the same time, microorganisms and viruses that are resistant to low heat are killed. The use of the UHT technique, which is a shock method, is of particular advantage for eggs in shells that have elevated proportions of viruses and microbiological load due to the region or environment.

The L. Pasteur batch method (pasteurization for 30 minutes at 63° C.), which is seldom used today, has been replaced by a continuous method of increasing heat and shortening time, in particular as follows:

Pasteurization=high heat, greater than 70° C., in particular
    A short waiting time or holding time, which is longer than 15 seconds and is preferably a maximum of 30 seconds
    Cooling (+4, +5° C.)

The most important property of the method is that of destroying microorganisms and viruses that are not heat-resistant as well as those that are heat-resistant, without denaturing the proteins of eggs in shells.

If heat and time are apportioned correctly in the method according to the invention, no fundamental changes occur to the egg yolk or the egg white. The following methods or method steps are intended for pasteurization and ultra-high temperature processing:

HTST pasteurization 70-75° C./15 to 30 seconds, in particular 72° C./15 seconds
ULTRA pasteurization 125-138° C./2-4 seconds
UHT above 135° C./longer than 1 second
HTST=high temperature-short time
UHT=ultra-high temperature=ultra-high heating The information provided above shows clearly that temperature and time play very important roles. Highly sensitive electronic devices for heat conduction and values for positive pressure/overpressure, which have been set in a highly sensitive manner, are used in the method and/or the device according to the invention. Of particular significance according to the invention is the combination of treating, and/or acting upon, the eggs using a liquid or vaporous or gaseous medium such as air, for example, at a specifiable pressure in combination with the heat treatment, by way of which damage to the eggshell is prevented in a surprisingly simple manner. The pressure and/or overpressure acting on the eggs is specified as 0.4 to 1.2 bar and, preferably in the range of 0.5 to 1 bar, with consideration, in particular, for the firmness of the shells of the eggs to be treated.

Pasteurization within the scope of the known technology is carried out in particular such that the eggs in shells are heated and pasteurized with the aid of a water bath or along the path of various heat transfers, from the eggshell to the egg white and to the egg yolk.

This method is not always successful, however. In cases where, due to environmental problems, microorganisms present on the eggshell reach the interior of the egg for various reasons, these microorganisms can be destroyed if the waiting time is short, the heat supply is short, the microbiological load is low, and if these harmful microorganisms are located near the shell. In all other cases, however, and if the harmful bacteria or viruses, in particular *Salmonella*, enter the bloodstream of the chicken when the chicken feeds and, after entering the egg, penetrate the egg yolk, it is possible that pasteurization will not be the solution, and nothing will work against harmful, heat-resistant microorganisms and viruses resulting from the environment or the region. In these cases, ultra-pasteurization is preferably further used.

In pasteurization as known and applied, the focus, with respect to the system of eggs in shells, is on various types of *Salmonella* and harmful microorganisms located in the vicinity of the shell.

The milk industry uses pasteurization+ultra-high temperature processing in regions where the microbiological load is high or cannot be kept under control. The UHT method is used in 93% of the world, which is to say that nearly the entire world is familiar with the UHT method. Since the microbiological load of milk, which is still sterile during milking, increases due to external influences, milk is first pasteurized and then treated using the UHT method, in order to extend the stability thereof on the store shelf.

In contrast, the UHT method is used with eggs because they are no longer sterile when laid, and because the microbiological load of the egg/eggshell increases due to external influences, owing to existent harmful microorganisms and viruses, and in order to extend the stability on the store shelf.

A brief summary of the method is provided in the following as an example:

a) Washing

Shortly after the eggs are laid, they are cooled to +4 to +5° C. and, directly thereafter, are washed, cleaned at +40° C., and rinsed, dried at 43° C.

b) Ultra-High Temperature Processing, UHT

In this UHT section, two methods were tested and successful results were obtained using both methods (these methods depend upon the microbiological load).

In method 1, after a holding time of 72° C./15 seconds, then 125° C./4 seconds, followed by 142° C./2 seconds, the rinsed eggs are heated in direct form and then cooled in a shock-like manner to +4 or +5° C.

In method 2, after a holding time of 72° C./15 seconds and 142° C./2 seconds, the rinsed eggs are heated and then cooled in a shock-like manner to +4 to +5° C.

c) Coating or Packaging

The cooled eggs are coated or packaged aseptically as required according to the Food and Drug Act (food-grade paraffin, organic materials, etc.).

Note: The water used in the UHT method is sterilized at 137° C., and with a holding time of 1800 seconds, before it is used for heating and cooling. In addition, the sections used in ultra-high temperature processing and coating are sterilized before use and protected using positive pressure (positive pressure greater than 0.5 bar). This UHT shock method which is used does not fundamentally alter the eggs. It is also characterized in that it meets the requirements for human health. Thus it is a method that can be used successfully with respect to existing and future harmful microorganisms and viruses.

Monitoring and Analysis

*Salmonella* injected using an inoculation procedure and bacteria transmitted by infection were tested 47 times in the UHT methods set forth in Method 1 and Method 2.

The test results are presented below.

Yeast and mold were diluted to −1 on a PDA culture medium using a standard plaque dilutional smear method. No microorganisms were observed. Coliforms were also analyzed using VRBA culture medium with incubation at 35° C., using the method applied above. It was observed that everything was clean, yet *Salmonella* in all stages were created. When BSA was used, no black colonies were observed.

In the analysis of *Staphylococcus aureus*, no black colonies were observed.

The result of a total viable count was negative.

In the quality tests that were performed, no fundamental losses were observed with respect to the weight of the egg, the index of the egg yolk, or the functional properties thereof.

Note: The eggshell was bored through using a special method, and a heat sensor, in particular PT 100, was inserted precisely into the middle of the egg yolk. This method was used with all of the eggs that were tested. The values of the digital display and the transcriber or transmitter (ohm mA) of the heat sensor or PT 100 were delivered to the analog input card of the PLC, thereby permitting all temperature values to be monitored and stored using a graphical display. The PID values of the heat system were very finely tuned and the deltaT was determined to be 0.1.

The present invention comprises a method of treating eggs in shells with heat in a liquid or gaseous or vaporous medium in a plurality of steps. In the method, the eggs are subjected to heating treatment, namely, preheated at approximately 60° C. at a positive pressure of at least approximately 0.4 bar, preferably at least approximately 0.5 bar, followed by shocking of the eggs by cooling of the eggs to 4 to 5° C., then the eggs are pasteurized by heating of the eggs at 70 to 75° C. for 10-20 seconds, and, after the pasteurization, the eggs are subjected to ultra-high temperature processing by heating the eggs at 140 to 145° C. for 1 to 5 seconds, and then the eggs are shocked by cooling of the eggs to 4 to 5° C. The term "eggs" in the present specification and claims mean eggs in shells.

Duration of the preheating is preferably 14 to 16 minutes. Duration of the cooling to 4 to 5° C. immediately following the preheating is preferably 1 to 5 minutes and, most preferably, approximately 2 minutes.

The eggs may be subjected to vibrating during the preheating.

Before the preheating, the eggs may be subjected to heat treatment at a temperature of approximately 165° C. for 1 to 5 seconds, preferably approximately 2 seconds, to sterilize the shells of the eggs. The eggs may then be washed with water.

The eggs may also be shocked by being cooled to 4 to 5° C. after the sterilization and/or before the washing and/or after the ultra-high temperature processing.

Between the pasteurization and the ultra-high temperature processing, heating may be carried out at a temperature of 121 to 128° C. for 2 to 6 seconds. The temperature is preferably 123 to 126° C. and most preferably about 125° C. The duration of heating is preferably 3 to 6 seconds and most preferably approximately 5 seconds.

The pasteurization is preferably carried out at a temperature of approximately 72° C. for approximately 15 seconds. The ultra-high temperature processing is preferably carried out at a temperature of approximately 142° C. for at about 2 seconds.

The medium, when used for the heat treatment and/or the pasteurization and/or the ultra-high temperature processing, has been sterilized. The medium may be resterilized and recycled into the process.

The eggs at 4 to 5° C. may be washed, rinsed and, preferably dried before pasteurization. The washing may take place at at least approximately 40° C. and the rinsing may take place at at least approximately 43° C. The pasteurization and/or the ultra-high temperature processing may be carried out at a predetermined positive pressure, preferably 0.4 to 7 bar, most preferably 0.5 to 1 bar. The term "pressure" in the present specification and claims means positive pressure.

The actual value of temperature, time and pressure may fall below or exceed the herein stated values by not more than 15%, preferably not more than 10% and, most preferably, not more than 5%.

The present invention also comprises apparatus for carrying out the method of the invention. The apparatus includes a sterilization unit which contains the medium. The sterilization unit includes at least one section for heat transfer.

Tanks and, preferably, further units, by way of which the medium can be heated and/or cooled are also provided. A pre-heating section is provided upstream, relative to the direction of conveyance of the eggs, of the pasteurization section. Between the preheating section and the pasteurization section a section is provided for shock-cooling the eggs.

Valves may be provided by means of which flow of the medium for the pasteurization and/or for ultra-high temperature processing may be controlled. A pressure container for the medium may be provided. The preheating section and the pasteurization section may be disposed in the pressure container.

The forgoing description relates to apparatus for batch processing. Another embodiment, described in detail hereinbelow, is apparatus which forms a continuous system in which transport means convey the eggs.

The invention is described in greater detail in the following with reference to exemplary embodiments shown in the drawings, without being limited thereby. The method and the device are described with reference to FIG. 1 to FIG. 3 in accordance with published international application WO 2009/132856 A2, the entire contents of which application are incorporated herein by reference. The present invention is a development thereof in combination with additional features and measures, and is described in the following with reference to FIG. 4 and FIG. 5.

As described above, the invention serves to treat poultry eggs independently of the subsequent use thereof, in particular as food or as genoblast eggs, the latter being preferably intended for use in raising poultry or chicks. It is expressly pointed out that, within the scope of the invention, water or another liquid or vaporous or gaseous media can be used, in an analogous manner, in place of the medium, to treat the poultry eggs in shells. Shown are, in schematic depictions:

Region A ── ── · ── ── · ── ── · ──

Region B ─── · ─── · ─── · ─── · ───

Region C · · · · · · · · · · · · · · · · · · · · · · · · · · · · · · · · · · · · · · · ·

Region D ─── ·· ─── ·· ─── ·· ─── ·· ──

Region E ── ··· ── ··· ── ··· ── ··· ──

Region F ──────── ── ── ────────

Region G ----------------------------------------------------------

Figure 2:
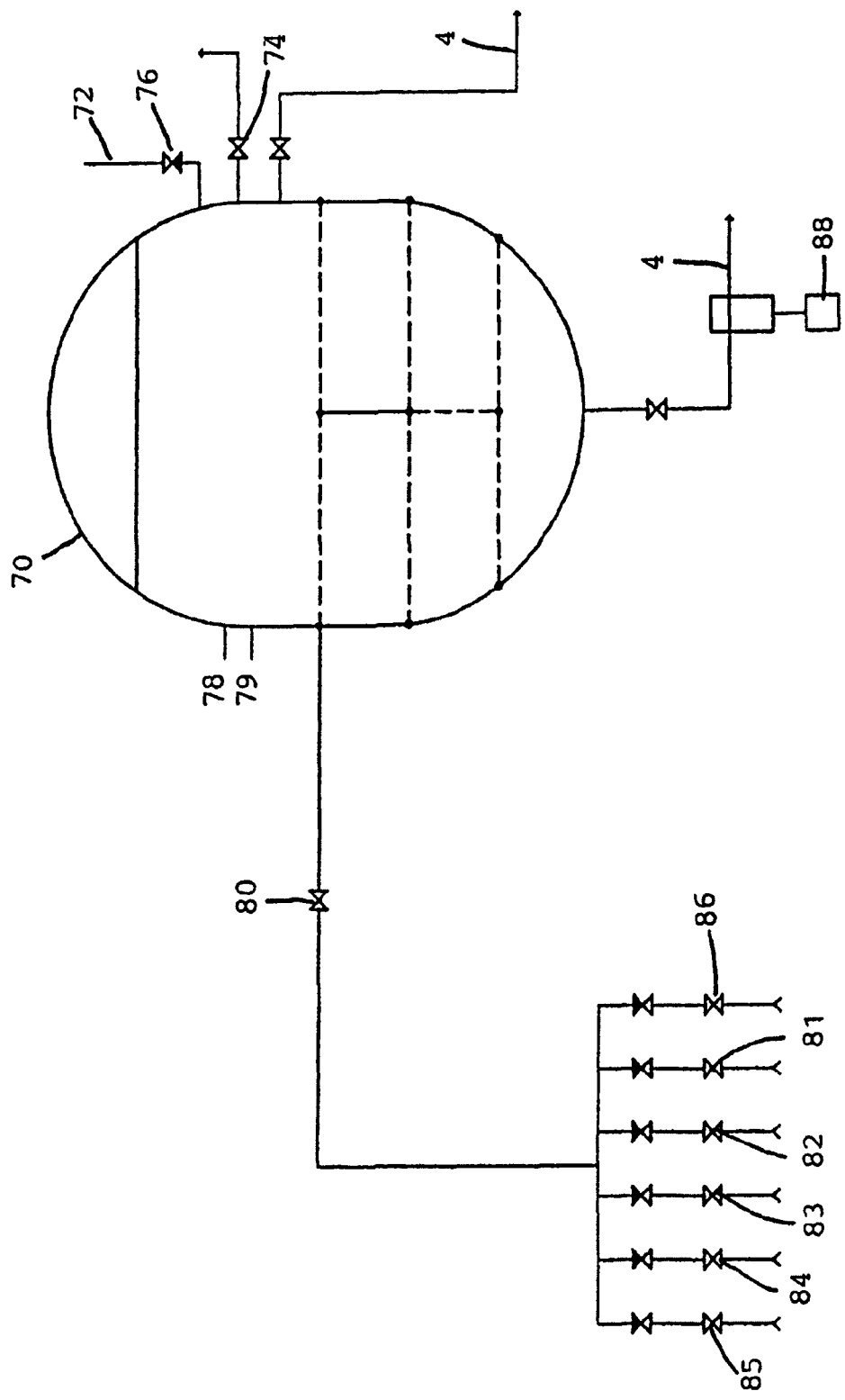
Figure 3:
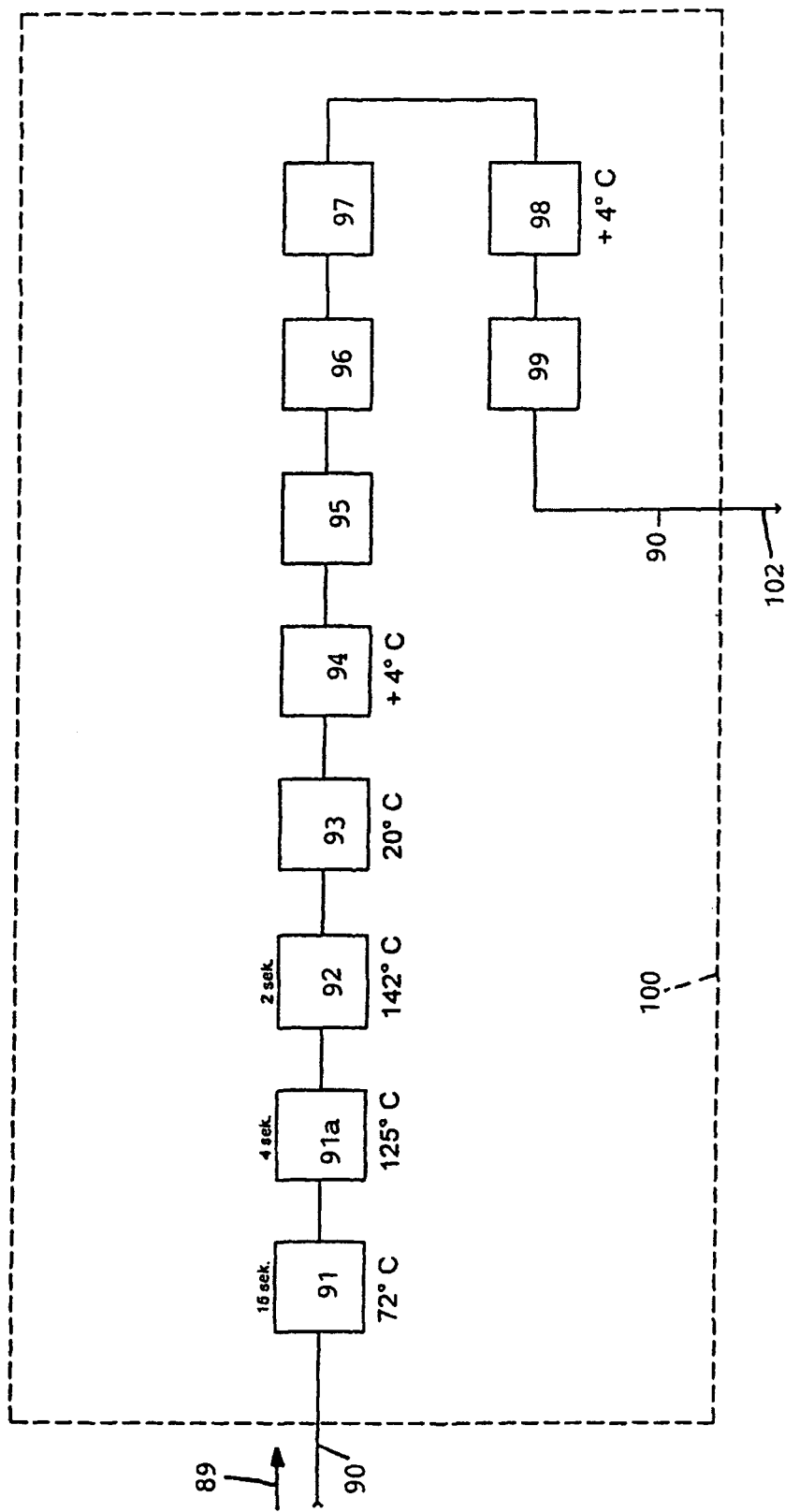
Figure 4:
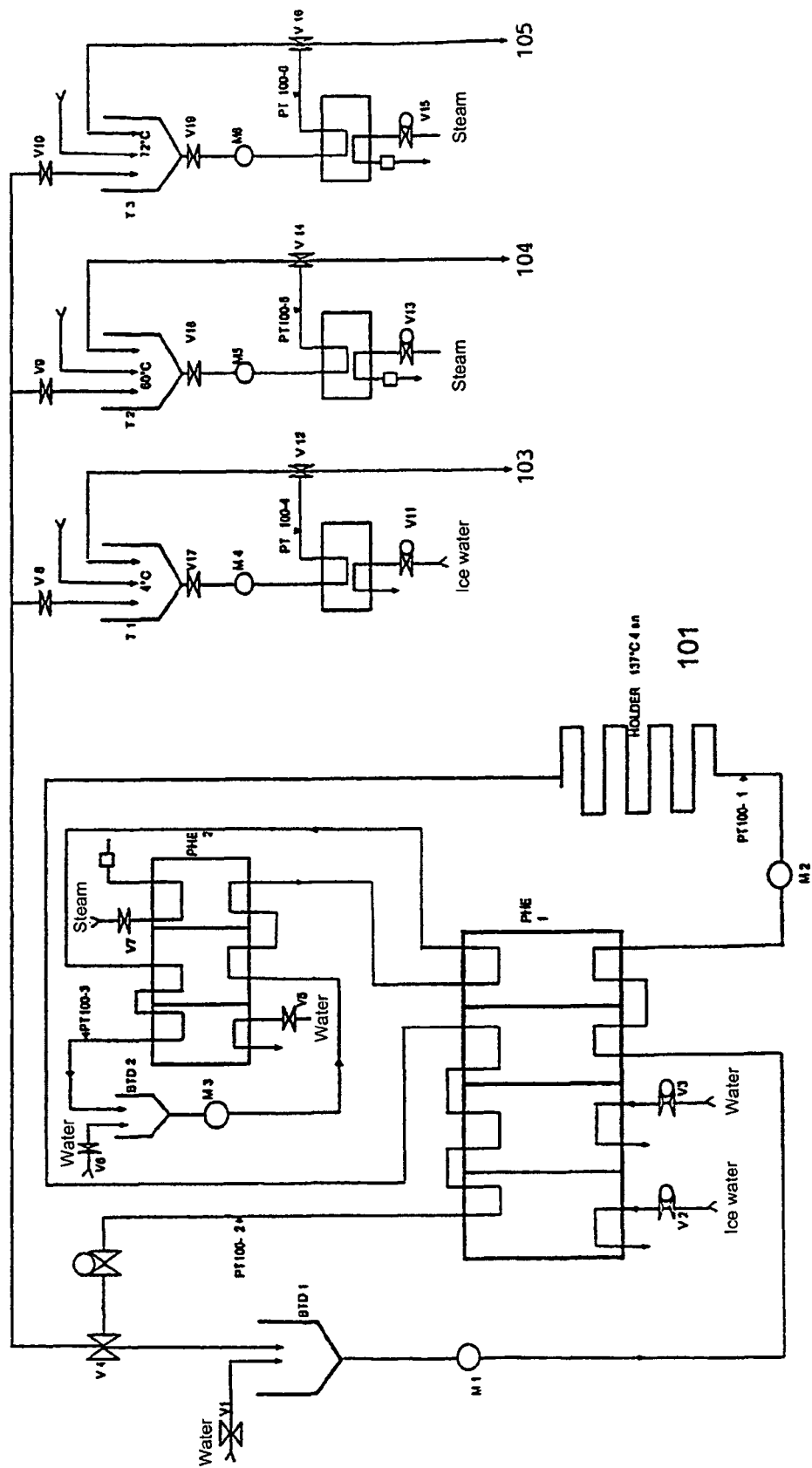
Figure 5:
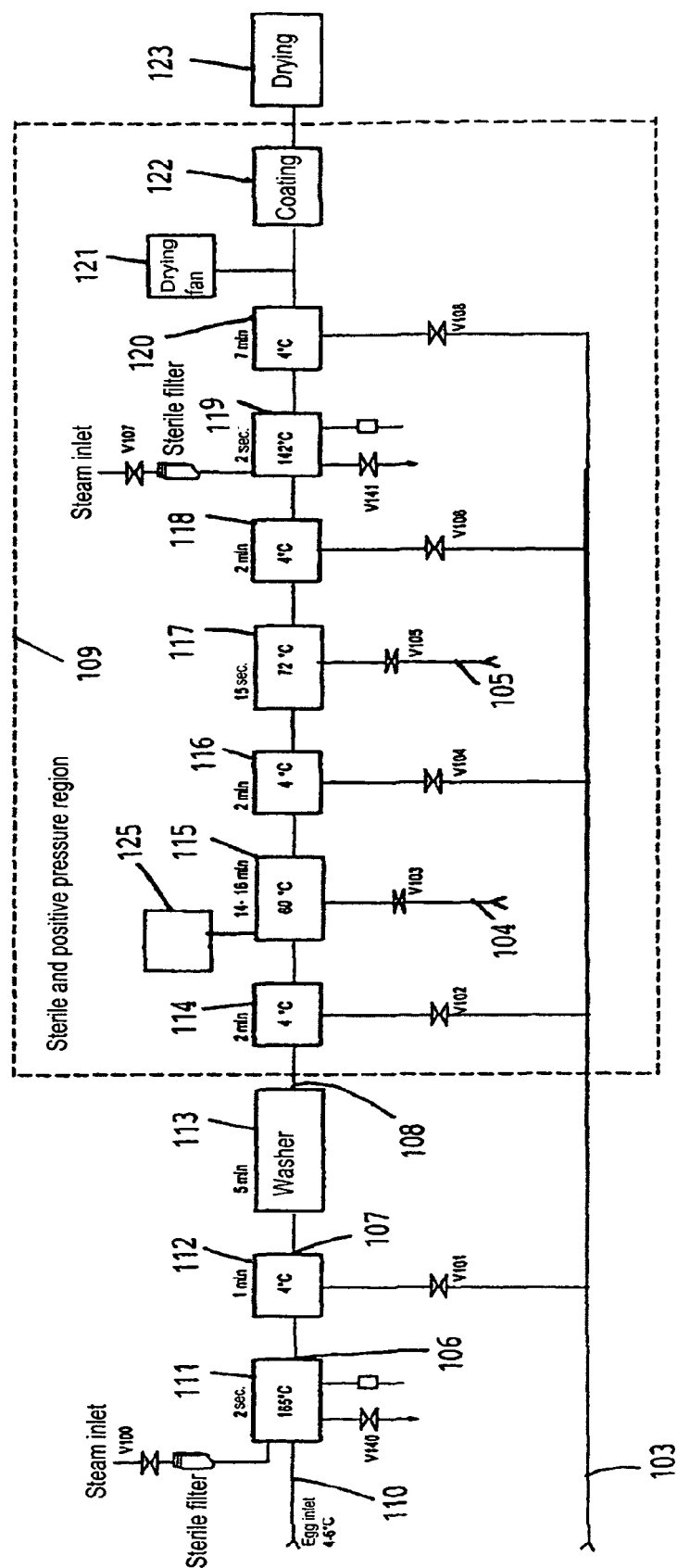

FIG. 2 batch sterilization, or temporally staggered sterilization, using a pressure container which contains the eggs to be sterilized and to which sterilized water having different temperatures is supplied, FIG. 3 a continuously operating system, FIG. 4 a particular embodiment of the sterilization, or sterilization unit, according to the invention, notably with water, FIG. 5 a particular embodiment of the sterilization of eggs in shells according to the invention.

DETAILED DESCRIPTION OF THE INVENTION

Figure 1:
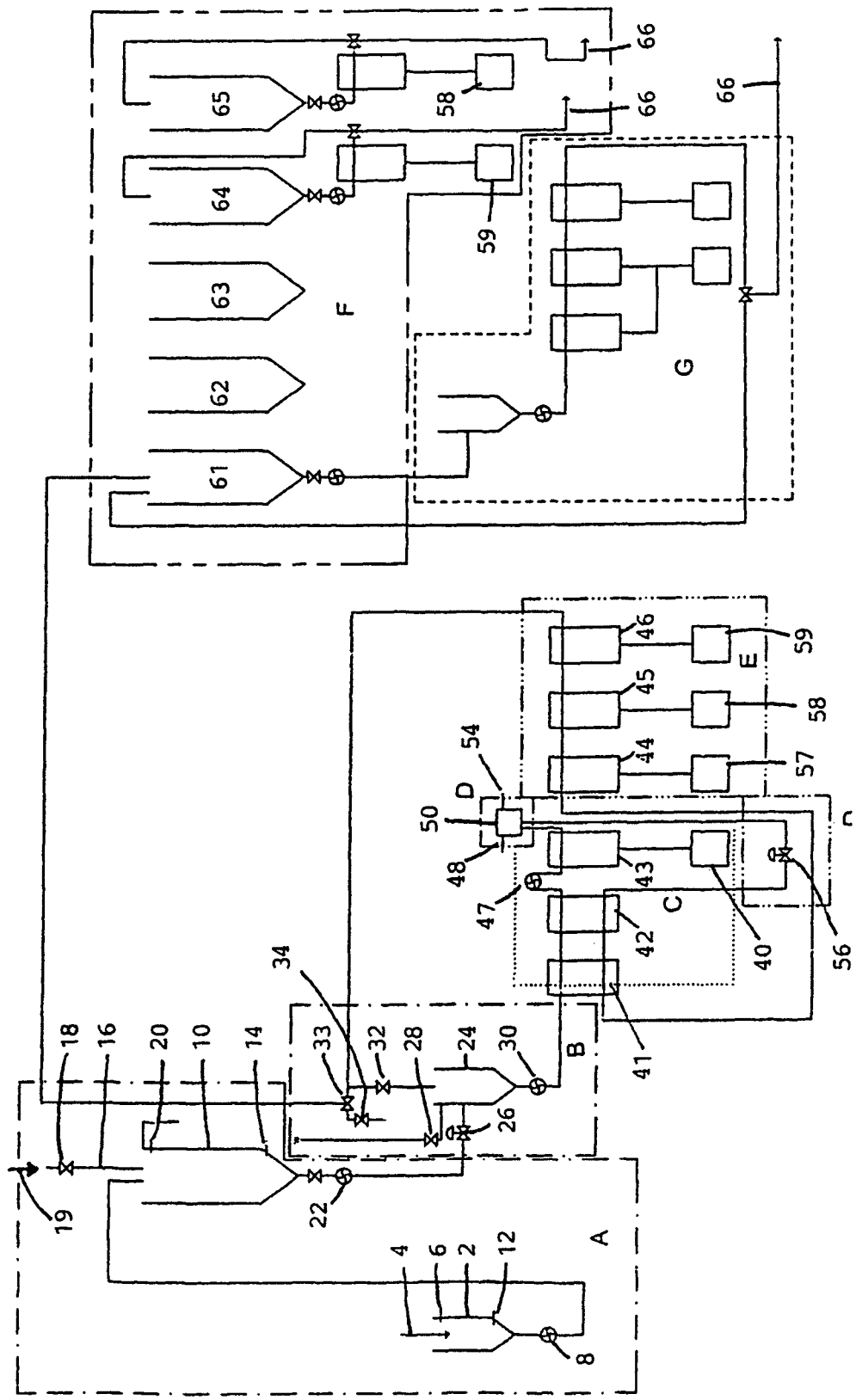
FIG. 1 sterilization of, or sterilization unit for, the water used, and the operational regions, which are labeled as follows.

According to FIG. 1, a first tank 2 is provided in region A, by way of which the water returning, or returned, from the systems or devices according to FIG. 2 or FIG. 3, as indicated by arrow 4, can be directed to re-sterilization. This first small tank 2 is a compensation tank, e.g. for 250 liters, in which the treated water 4 from the process is first stored. When a high-level sensor 6 becomes active, a pump 8 underneath the compensation tank 2 automatically starts operating and sends the water from the compensation tank 2 into a second, large water storage tank 10. This procedure continues until the compensation tank 2 low-level is activated, which is to say, when the level in the compensation tank 2 is low, the low-level sensor 12 turns on and stops the pump 8.

The tank 10, which notably holds 5 tons, is actually a compensation and supply tank. It serves to supply the water to be used in the process to the sterilization unit and to store the water that was used in the process, so that it can be used later. The working principle on which this is based is that the 5-ton tank 10 attempts to reach its level using the water that comes from the small compensation tank 2. However, if the incoming water is insufficient to reach the level, the low-level sensor 14 thereof turns on, and the 5-ton tank 10 automatically starts to obtain additional water 19 from the exterior by way of a line 16 and a valve 18. This procedure continues until the high-level sensor 20 is activated. If the water from the small compensation tank 2 exceeds the level of the 5-ton tank 10, it is allowed to flow out. The pump 22 underneath the 5-ton tank 10 operates depending on the level of the compensation tank of the sterilization unit or continuously when the sterilization unit is operational. The level of the compensation tank 2 or 10 of the sterilization unit is preferably measured automatically (2-20 mA) and the level of the compensation tank is maintained constant by way of the proportional valve in the inlet. The level can also be maintained constant by way of a mechanical floating element which can be installed in the compensation tank.

The inlets and outlets of the water sterilization unit are located in region B. A further compensation tank 24 of 500 liters, for example, is located in the inlet area. A proportional valve 26 and a water inlet valve 28 are disposed upstream of the compensation tank 24, and a pump 30 is provided at the outlet of the compensation tank 24.

Valves 32, 33, 34, for redirection to the compensation tank, to the outlet, and to the tanks for storing sterilized water, are disposed in the outlet area of region B. Furthermore, water can flow out by way of the valve 33.

A hot water unit 40, for ensuring heat transfer and sterilization temperatures, is disposed in region C. A plate or tubular heat exchanger, or the PHE or THE method, is used for heat transfer. Six sections 41 to 46 for heat transfer are located within the system. The first three sections 41 to 43 of these six sections are used in region C. Of these sections, the first and second sections 41, 42 are used for preheating before sterilization, and contribute to reaching the sterilization temperature. The pressure drop in the first and second sections is ensured by way of the pump 30, underneath the compensation tank 24. The water-cooled assist pump 47 for increasing pressure serves to offset the pressure drop in the other regions and ensure continuous flow. The third section 43 serves in reaching the sterilization temperature. The hot water unit is a closed circuit system and notably operates at a 6 bar steam pressure. By way of the pressure sensor 48, in particular PT 100, located in the inlet of a holder unit 50, and a proportional valve 52 having steam admission, the hot water system is supplied with steam in such a way that the holder 50 reaches the set, or setpoint, temperature. For the steam, the hot water system contains a plate heat exchanger for heating the water, an element countering steam condensation, a hot water pump, a manually operable valve for controlling the water flow, and a supply device for filling the hot water system.

The holder, or setpoint unit, 50 which performs the sterilization, is located in region D. The pressure sensor 48 at the inlet of the holder unit 50 controls the steam valve 56 in the hot water unit as a function of the temperature of the holder setting. A pressure sensor 54, in particular PT 100, and a valve 56 are located at the outlet of the holder unit 50. The valve 56 takes the form of a modulation valve for generating a constant pressure. The temperature sensor 54 at the outlet of the holder 50 detects the outlet temperature of the holder, and the valve 56 generates a counter-pressure to prevent boiling in the system. The holding time, or setpoint time for the system, was defined as 300 seconds; other time values can, however, also be set. The reasons for which 300 seconds was selected relate to increasing the volume in the interior of the sterilization system, with the waiting time for sterilization of the water at 1800 seconds, which is to say that the entire volume of water in the system is sterile in 1800 seconds and the total volume in the system is 2058 liters. Approximately 40 tons of water can be sterilized daily using this system. From the perspective of the health of humans and eggs, the water used in the process must be sterilized in a natural manner.

The cooling procedure is shown in region E. The sterilized water is used in the preparation of the water that is required for the holding tank and is maintained at the correct temperature, for the duration of the sterilization within the system cycle, which is to say, during sterilization which lasts for 1800 seconds, and therebefore and thereafter, so as to keep the heat that returns into the compensation tank below the boiling point.

Region F contains five tanks 61 to 65, each notably having a capacity of 5 tons, and the pumps thereof. The sterilized water is stored therein and, from there, is supplied to the system. The temperatures of the sterile water in the tanks are substantially specified as follows: first tank 61 at 95° C.; second tank 62 at 95° C.; third tank 63 at 65° C.; fourth tank 64 at 4° C.; and fifth tank 65 at 20° C. The sterile water at 95° C. from the first tank 61 is heated in the closed hot water system to 142° C., the sterile water from the second tank 62 at 95° C. is also heated in a second closed hot water system to 125° C., and the sterile water from the third tank 63 at 65° C. is heated to 72° C. The sterile water from the fourth tank 64 at 4° C. is delivered into the system at 4° C. It is sent through a cooling heat exchanger to prevent it from heating up. The sterile water from the fifth tank 65 at 20° C. is delivered to the system at 20° C. It is also sent through a cooling heat exchanger to prevent it from heating up. By way of the particular outlets, the sterile water at the aforementioned temperatures is delivered to the system for sterilizing the eggs according to FIGS. 2 and 3.

Note: In FIG. 1 in region F, a region G in which the warm water preparation takes place is shown only for the first tank 61. The tanks 62 and 63 each have their own similar regions for preparation of warm water. In addition, the five tanks prepare their water themselves in a cyclical manner and deliver it to the further systems when they require it. The water is always available at the desired temperature at the outlets 66. The hot water units 40 and the cooling unit 58 are located in region G. Another cooling unit 58 is located in region E. Respective cooling units with ice water are located in regions E and G and a heating unit with 3 bar steam is located in region E.

The water sterilization system preferably has the following technical characteristics:
Capacity: 10 000 l/h
Pipe diameter: 51 mm SMS
Pipe inner diameter: 48.5 mm
Volume in the pipe: 1.847 l/h
Holding tube time: 300 seconds
Holding tube length: 451182 mm
Holding tube volume: 833.3 liters
Flow velocity: 1.5 m/second
Total volume of the water sterilization system: 2058 liters
Hot water capacity: 14,000 l/h
Water inlet temperature: variable
Water outlet temperature: +4° C., +20° C. and 95° C.
Required flow volume of the system: 380 VAC 50 Hz
Required air pressure of the system: 6 bar dry air
Required steam pressure of the system: 6 bar Other characteristic can also be specified, within the scope of the invention, in accordance with the requirements.

FIG. 2 shows the batch sterilization of the eggs in shells, and the working principle is described in the following. At least one pressure container 70 is provided in order to prevent the water from boiling. Furthermore, a pressure of at least 0.4 bar is specified for the pressure container or pressure containers, and up to 7 bar depending on the requirements and/or usage conditions.

After the eggs are placed in the pressure container 70 in a row, sterile air, notably at 0.5 bar, was applied to the containers.

The following components, in particular, are provided in order to generate the sterile air with the required pressure and introduce it through the inlet line 72: an air compressor that produces no oil or water; a stop valve; a strainer; two air filters/ultrafilters; a safety valve 74; and a proportional valve. Before this air system begins operation, the air path is sterilized upstream of the stop valve and/or a non-return valve, for 1800 seconds, with a steam pressure of 2.5 bar. The two filters in the main steam path serve to trap any particles from the steam.

The sterile water having a different temperature, which was prepared in region F according to FIG. 1, is heated or cooled in region G, and is directed into the pressure container or pressure containers 70, in a certain sequence, by way of the outlet lines 66 and the connected valves 81 to 85. According to the invention, the inlet and outlet procedures are carried out in such a way that they take place without delay and/or directly one after the other. The control of the valves, and the specification and/or monitoring of the sterilization and the parameters such as temperature and duration are carried out by way of a non-depicted control unit which takes the form of, or comprises, a computer, software and the like.

The eggs, which are disposed in the pressure containers 70 at 0.5 bar, are exposed to different temperatures one after the other in a temporal sequence, wherein the temperature of the eggs in the pressure container or pressure containers is initially approximately 43° C. First, sterile water is obtained from the tank 63 in region F at 65° C., this is heated to 72° C.

in region G, and the stop valve 82, and the stop valve 80 are opened so that sterile water at 72° C. is admitted from nine points simultaneously, in a homogeneous manner, into the pressure container 70 until a previously calculated volume is reached (the valves used in the system are NC). Once the sterile water at 72° C. has been held for 15 seconds, valve 87 opens. It remains open for a time corresponding to the volume of the pressure container, but upon achieving a volume discharge of 75%, valve 85 is opened, whereby the prepared sterile water at 125° C. enters the pressure container 70. Once the remaining 25% of the volume discharge has been completed, valve 87 is closed, and the valve 85 is closed at fill volume completion (with regard to the air present in the pressure container at 0.5 bar, because access is provided from the air supply system, no pressure loss occurs when the valves are opened).

Note: The application at 125° C. is used only for method 1, which was initially described, which is to say, in environments in which the microbiological load is particularly high.

After a 4-second holding or waiting time at 125° C., the discharge valve 87 is opened and the water, which is at the boiling point as it emerges to the outside, is cooled and stored by a heat exchanger 88 which is preferably in the form of a heat exchanger plate and/or serves as a cooling unit.

When 75% of the discharge has been achieved, valve 81 is opened, the sterile water at 142° C. flows into the interior, and when the volume discharge is reached, valve 87 closes once more. After a waiting time of 2 seconds, valve 87 opens once more and, at 75% volume discharge, valve 83 opens and the warm water at 20° C. begins to flow in. After the volume discharge has been completed, the valve 87 is closed once more and the valve 88 opens (upper level pressure compartment—valve at the overflow level). Once the first cool down has been completed in accordance with the predetermined time, valve 88 is closed and valve 87 is opened. The volume discharge begins and, at a discharge of 75%, valve 84 is opened. The sterile water at 4° C. begins to enter the pressure compartment. Once the volume discharge has been completed, valve 87 is closed and valve 88 is opened. Furthermore, a valve 86 is provided as a backup. Note: When the valve 88 opens, the air system stops functioning.

Once the eggs have cooled to 4° C., they are cooled using sterile air and are thereby prepared for coating of the eggshells.

Note: The region in which the pressure compartment is located and the region in which the eggs are coated were sterilized before use, and positive sterile air was used continuously once sterilization began. The air filters/ultrafilters used in the air system must be replaced after being used 50 times. Otherwise it may not be possible to maintain sterility.

Note: A tubular system can be used instead of the pressure compartment or the pressure container 70 in the drawing in FIG. 2.

According to FIG. 3, a continuous method or system is used, the design and mode of operation of which will now be described. After the eggs are laid, they are cooled to +4 or +5° C. (they are cooled because they may need to be stored or transported). In particular, washing is carried out at 40° C. by way of brushing or with a system such as a centrifugal system. During washing, the shells are cleaned, and it is ensured that the pores of the eggshells open.

After the washing procedure, the rinse procedure is carried out. The temperature of the rinse procedure must be 3° C. warmer than that of the wash water. After rinsing, the eggs are dried using an air stream, an air curtain or any another air-drying method.

Note: Since the above-mentioned processing steps are carried out before sterilization, positive air pressure is still used in these regions.

At approximately 43° C., the cleaned, air-dried eggs pass through a very narrow region, as indicated by arrow 89, by way of a transport means 90, and in particular a conveyor belt, so as to enter the sterilization section. An air curtain is once more used during this passage. The first heating (72° C.) takes place in the first region 91, and/or the second heating (125° C.) takes place in region 91a. In the second region 92, the final heating takes place (UHT 142° C.) and the eggs enter the cooling regions. The first cooling (20° C.) takes place in the third region 93, the second cooling (+4° C.) takes place in the fourth region 94, and drying (with air) takes place in the fifth region 95. In the sixth region 96, the eggshell is coated, notably by way of immersion, spraying or similar coating techniques, with the heat set to between 60 and 70° C. Drying (with air) takes place in the seventh region 97, cooling (+4° C.) takes place in the eighth region 98, and the final drying (with cold air) takes place in the ninth region 99. The egg that has passed through these regions, notably on the conveyor belt 90, exits the sterilization unit according to arrow 102 for subsequent packaging and storage. When exiting, this unit is protected with an air curtain and the eggs can be delivered by way of various packaging systems into the storage facilities, preferably at 4° C.

The sterilization unit indicated by the dashed line 100 is outwardly closed to the environment to the greatest extent possible and/or takes the form of a housing and/or a chamber, and is sterilized before use. Since a positive pressure is built up inside this unit, according to the invention, air does not enter from the outside. An air curtain is preferably used in the subsections that are exposed to the atmosphere, in particular at the inlet and outlet of the transport means 90. Water, steam or air can be used in the heating region. If water is used, it must have been sterilized in advance, as described with reference to FIG. 1. If steam is used, the water that is vaporized must be of high quality and the steam must pass through filters installed closely one after the other. If air is used, the air system must be sterilized, as described with reference to FIG. 2. The sterilized air can be heated without coming in contact with the air heating unit, and can be used in the heating section of the sterilization unit.

Particular embodiments of the invention are described in greater detail with reference to FIGS. 4 and 5, wherein the descriptions provided above apply in an analogous manner, and only new or modified components, regions or modes of operation will be described in detail. With consideration for the fact that the microbial load can increase in the period of time prior to the egg from the farm reaching a consumer, the object to be achieved is, in particular, that of reducing the quantity of microorganisms, and in particular *Salmonella* and bacteria, by a magnitude of at least log 7. The object is to ensure a level at which the microbial load does not endanger the health of the consumer. In conjunction with this reduction of the microbial load, it should also be ensured that the nutritional values, in particular the protein and vitamin values, are retained. According to the invention, risks to human health due to the consumption of an egg in a shell containing *Salmonella* has been considerably reduced. Laboratory results verify a reduction of the magnitude of log 8.

The sterilization and storage of the water used to sterilize eggs in shells, before use, is described with reference to FIG. 4, wherein the following abbreviations apply:
BTD: compensation container
PHE: heat exchanger/plate heat exchanger
M: pump PT100: temperature sensor
T: tank
V: valve The water requirement of BTD 1 for the water sterilization region, and for entire system, is satisfied by opening V1, and the water requirement of BTD 2 for the warm water region is satisfied by opening V6. Simultaneous therewith, M1, M2 and M3 are actuated, and V4 is directed toward BTD 1 in such a manner that the water flows therein. The control of the pumps, valves and further components takes place using a preferably electrical or electronic or computer-supported control unit, which is referred to in the hereafter as a control device or a control system.

Since the specified target temperature in the container 101 is substantially +137° C., the steam valve V7 in the warm water region is activated. To ensure that the BTD 2 can hold the return temperature of 85° C. constant, the control unit or the control device activates V5 on the basis of the information coming from the PT100 3. To maintain an inlet temperature of +137° C. in the container 101, the control device activates the steam valve V7 on the basis of the information coming from the PT100 1.

To ensure that the BTD 1 can maintain the return temperature below the boiling temperature, the control device activates the valve V3 on the basis of the information coming from the PT100 2, and maintains the temperature constant at +85° C.

The sterilization time begins, once the temperature of +137° C. is maintained constant in the container 101. This phase lasts for 30 minutes. If the temperature in the container falls below +133° C., the sterilization time is stopped. Once the temperature has reached the desired default value, the 30-minute phase starts anew.

Upon expiration of the sterilization time of the water, the temperature of the water that returns to the BTD 1 is set to +72° C. and V3 is activated. As soon as the temperature in the PT100 2 reaches a value of 72° C., the valves V4 and V10 are activated, and the container T3 is filled with warm sterile water at +72° C.

After the container T3 is filled, the system is filled with water once more. After the 30-minute sterilization phase, an outlet temperature of +60° C. is set. V9 of T2 is opened and T2 is filled with warm sterile water at +60° C. Once sterile water has been obtained, the outlet temperature is set to +4° C. and the valves V3 and V2 are activated. Once the outlet temperature of +4° C. has been reached, V8 is opened and T1 is filled with warm sterile water at +4° C.

All the containers are filled with sterile water. Various circuits are used to maintain the temperature of the sterile water in the containers or tanks.

For the T1 circuit, V17/M4/V11/V12/PT100 4 are activated, and the temperature of +4° C. in the container is maintained constant.

For the T2 circuit, V18/M5/V13/V14/PT100 5 are activated, and the temperature of +60° C. in the container is maintained constant.

For the T3 circuit, V19/M6/V15/V16/PT100 6 are activated, and the temperature of +72° C. in the container is maintained constant.

The sterile water obtained in this manner is therefore ready for the application described in FIG. 5.

The sterilization of the egg in the shell, or eggs in shells, is described with reference to FIG. 5. This apparatus includes an egg inlet and contains thirteen regions 111 to 123 which are referred to in the following as sections. 103, 104, 105 are conduits. 106, 107, 108 are inlets.

Sterile steam is used in sections 111 and 119. Cold air is used in sections 121 and 123. Sterile water is present in sections 112, 114 to 118, 120. Cleaning takes place in section 113, and packaging or coating takes place in section 122.

The warm, sterile water at +4° C. which is already in the ready-for-use state in the tank T1 is excluded from the circuit here and is conveyed into the system in FIG. 5 by way of the line 103. The components or parts V17/M4/V11/PT100 4/V101/V102/V104/V106/V108 are activated and the sections 112, 114, 116, 118 and 120 in FIG. 5 are filled with warm, sterile water at +4° C.

The warm, sterile water at +60° C., which is already in the ready-for-use state in the tank T2, is conveyed into section 115 by way of the line 104 by activating the components or parts V18/M5/V13/PT100 5/V103. The parts of the system or the device are referred to in the following as components, for simplicity.

The warm, sterile water at +72° C. which is already in the ready-for-use state in T3, is conveyed via the line 105 into the section 117 shown in FIG. 5 by activating and/or opening the components V19/M6/V15/PT100 6/V105.

To maintain the temperature of the sterile water in the various sections, this water connects to a circuit comprising the containers and/or tanks in FIG. 4.

Filtered steam is used in sections 111 and 119. These regions or sections are closed and hydraulically controlled systems which are operated under pressure. Steam pressure values were defined for the temperatures present in these sections.

The previously stabilized steam pressure in the working system of section 111 is available upstream of V100. As soon as V100 is activated, i.e. opened, the steam enters the hydraulically controlled and closed section 111 uniformly at +165° C. After a waiting time of 1 to 5 seconds, and in particular 2 seconds, V140 is activated, thereby permitting the steam to escape from the interior. Simultaneously, the opening point 106 of the section 111 is opened, in particular by way of a hydraulic system.

The previously stabilized steam pressure in the working system of section 119 is available upstream of V107. As soon as V107 is activated, i.e. opened, the steam enters the hydraulically controlled and closed section 112 uniformly at +142° C. After a waiting time of 1 to 5 seconds, and in particular 2 seconds, V141 is activated and/or opened, thereby permitting the steam to escape from the interior. Simultaneously, the opening point 107 of the section 112 is opened with the hydraulic system.

The sections 114 to 122 are isolated from the remaining sections and/or are under positive pressure, in particular in a pressure container 109 as indicated by the dashed line. The positive pressure or the overpressure with respect to the outside space is substantially greater than 0.4 bar, preferably greater than 0.5 bar. Depending on the quality of the eggshells, the positive pressure is specified to a maximum of 1.2 bar, and preferably up to 1 bar.

The egg in the shell, or the eggs in shells, are transported from one section to the other by way of transport machines. The systems, components and machines in FIGS. 4 and 5 are controlled by a control unit, and preferably by three different control systems, and in particular PLC systems.

The functions of the regions, sections or compartments of the device according to FIG. 5 and the corresponding method steps are described as follows:

1. The eggs, which have been cooled to a temperature between +4° C. and +10° C. and delivered to the inlet 110 of the system, are sterilized in advance, in case any spore-containing or spore-free bacteria or viruses are present on the shells thereof. This procedure takes place at 165° C. in section 111 and lasts for 1 to 5 seconds, and in particular substantially 2 seconds. Microbes, bacteria or viruses on the shell are thus destroyed, so that each pore in the shell, can extend into the interior, even with the subsequent heat treatment.

2. The eggs are then cooled to +4° C., notably in a shock-like manner, and are cooled for 1 to 5 minutes, and in particular one minute, at +4° C., and then delivered to the washing step or the washing unit 113. According to the invention, the sterilization temperature does not therefore unduly heat the egg white and the egg yolk.

3. The eggs are washed at between +10° C. and +20° C. with clean water, using brushes or using a similar method, without the addition of chemicals, and are delivered to the system in the cold state. This procedure in section 113 lasts for approximately 3 to 8 minutes, and in particular 5 minutes.

4. To ensure that the internal temperature of the eggs that arrive from the washing unit 113 can be maintained constant, the eggs are conveyed into the compartment 114, which is at +4° C., and are accommodated therein for 1 to 5 minutes, in particular 2 minutes.

5. The eggs, which have a constant temperature, are retained in the preheating compartment 115 at +60° C. for 10 to 20 minutes, and in particular 14 to 16 minutes. While the eggs are located in the preheating compartment 115, they are exposed to a particular mechanical vibration, for 10 to 20 minutes, and in particular 14 to 16 minutes, by way of a vibration unit 125. The purpose of this preferred embodiment is to prevent protein denaturation. More specifically: in effectively destroying the *Salmonella* in the egg yolk, which is the target region, the egg white is the part that is first confronted by heat; the heat then penetrates the egg yolk. The egg white must therefore be protected. This is because protein denaturation may have already taken place by the time the heat reaches the egg yolk. For this reason, according to the invention, the egg is exposed to a particular mechanical vibration.

6. The eggs that exit the preheating compartment 115 are accommodated in the cooling compartment 116 at +4° C. without the heat having been reduced, in order to cool the egg white which was heat-treated for a long period of time. The eggs remain here for 1 to 5 minutes, and in particular 2 minutes. This is shock-cooling, which prevents protein denaturation, notably of the egg white, and maintains the heat in the egg yolk constant. It is also ensured that the holding time and, therefore the heat treatment in the egg yolk, is continued. It is particularly significant that the egg white is cooled from the outside while the heat still penetrates inwardly into the egg yolk, thereby continuing the heat treatment thereof, and any microbes, bacteria or other pathogens present there are killed.

7. The eggs that emerge from the compartment 116 at +4° C. are accommodated in the compartment 117 at +72° C. for 10 to 20 seconds, and in particular 15 seconds. The heat is thus increased, and the heat treatment in the egg yolk continues, with protein denaturation, notably of the egg white, being prevented.

8. The heat treatment is continued and, to prevent protein denaturation from taking place, according to the invention, the eggs in the compartment 118 are exposed once more to shock-cooling at +4° C. for 1 to 5 minutes, and in particular 2 minutes. Since the cold cannot penetrate into the egg yolk during this time and, therefore, the heat is not reduced there, the holding time and/or the heat treatment for the egg yolk continues.

9. After the shock-cooling, the eggs are accommodated in the UHT compartment 119 (ultra high temperature) at +142° C. for 1 to 5 seconds, and in particular 2 seconds. Once this procedure has been completed, many heat-resistant and non-resistant bacteria and viruses have been destroyed.

10. With the microbiological load in the eggs reduced, they are accommodated, according to the invention, in the cold compartment 120 at +4° C. for 5 to 10 minutes for rapid cooling. At the end of this period, the holding time has been reached. Residency in the cold compartment is longer because the eggshell is coated in the next step and, after the coating process, cold conduction will be diminished.

11. The eggs are now cooled, and the water layers on the eggshell are dried using a ventilation system 121 before the coating process. The drying procedure lasts for approximately 3 to 8 seconds, and in particular approximately 5 seconds.

12. The cooled eggs are coated with a system 122 specified according to the Food and Drug Act (food-grade paraffin, biomaterial) in a sterile manner.

13. After the coating process, the eggs are conveyed to the cold-drying compartment 123 and then to the packaging compartment, wherein a temperature of at least approximately +4° C. is preferably set and/or maintained.

Laboratory Data on the Investigation of Germ-Free Eggs

1. STUDY (addition of a certain quantity of *Salmonella* to the egg and determination of the quantity that is destroyed) This study is based on eggs that are purchased in packaged form in the supermarket. The analyses were carried out by the Control and Laboratory Directorate of Mersin Province, in Turkey. This analysis comprises the following steps:

a) *Salmonella* that were available: *Salmonella typhimurium* (ATCC 14028) was used as the test bacteria in the study. The preconditions for multiplication by a magnitude of $10^8$ were defined for the available, certified bacterial strain: incubation at 41° C. for 24 hours. The bacteria that replicated during the incubation were injected into the eggs, and the actual numbers thereof were determined. Two different methods were used simultaneously to determine the actual number. The first method is that of propagation on the surface of a classical solid medium. The bacteria which were prepared for the study were diluted and applied in several layers to the surface of the medium provided, which was stored in Petri dishes. The results were counted and the quantity of *Salmonella* was determined. The second method is the so-called TEMPO system from the company Biomerieux, in which the total number of living organisms was determined. The results are based on a comparison of both methods.

b) Injection of the *Salmonella* into the egg: Biologists were relied upon to bore a small opening in the eggs in a sterile environment, to permit passage of a syringe into the opening. Approximately $10^8$ of the bacteria (100,000,000/ml) in a quantity of 1 ml was injected into each of 6 eggs through these openings. The openings were glued shut using superfast adhesive and covered with aluminum foil.

c) Preparation for dilution: The bacteria were diluted by a magnitude of $10^7$. A quantity of 1 ml of this substance was injected into each of 6 eggs using the same method. Counting of the $10^7$ bacteria was performed as described in a). The dilution was continued. Further dilutions by magnitudes of $10^8$, $10^5$ and $10^4$ were prepared. Six eggs were each injected with 1 ml of each diluted substance. In all, 6 eggs were injected with 5 different dilutions ($10^8$, $10^7$, $10^8$, $10^5$ and $10^4$), and therefore a total of 30 injected eggs were obtained.

d) Sterilization process: The prepared sample eggs were subjected to a sterilization process in the same laboratory. At the end of this process the eggs were examined in this laboratory.
e) Examination of the eggs: The eggs that were subjected to sterilization were analyzed in the same laboratory. The quantity of *Salmonella* was determined in all of the eggs. The standard method of application on the surface was used.
f) Results of the bacterial concentration: In the examination of the injected *Salmonella*, the quantity thereof, which was estimated to be $10^8$, was confirmed by way of tests to be $3.6 \times 10^8$ (360,000,000/ml). The following quantities of *Salmonella* were also confirmed: $10^7$ ($3.6 \times 10^7 = 36,000,000$), $10^6$ ($3.6 \times 10^6 = 3,600,000$), $10^5$ ($3.6 \times 10^5 = 360,000$), $10^4$ ($3.6 \times 10^4 = 36,000$).
g) Results: According to these results, all the *Salmonella* were destroyed in the eggs that were injected with $3.6 \times 10^7$ (36,000,00) *Salmonella*/ml. Replication of the *Salmonella* was observed in a few eggs which were injected with $3.6 \times 10^8$ (360,000,000) *Salmonella*/ml. All of the remaining *Salmonella* were destroyed, however. A detailed listing of the results is presented in the following.

*Salmonella* Laboratory Tests

| Number of *Salmonella* (*Salmonella*/ml) injected into the egg | | | | | Egg No. | Injection | Result | |
|---|---|---|---|---|---|---|---|---|
| 10.8 | 3.6 | 360,000,000 | *Salmonella* | Bacteria | 1 | into the egg yolk | 760 | Bacteria (1) |
| 10.8 | 3.6 | 360,000,000 | *Salmonella* | Bacteria | 2 | into the egg yolk | 800 | Bacteria (1) |
| 10.8 | 3.6 | 360,000,000 | *Salmonella* | Bacteria | 3 | half into the egg yolk and half into the egg | 20 | Bacteria (1) |
| 10.8 | 3.6 | 360,000,000 | *Salmonella* | Bacteria | 4 | half into the egg yolk and half into the egg | 0 | Bacteria |
| 10.8 | 3.6 | 360,000,000 | *Salmonella* | Bacteria | 5 | into the egg white | 0 | Bacteria |
| 10.8 | 3.6 | 360,000,000 | *Salmonella* | Bacteria | 6 | into the egg white | 0 | Bacteria |
| 10.7 | 3.6 | 36,000,000 | *Salmonella* | Bacteria | 7 | into the egg yolk | 0 | Bacteria |
| 10.7 | 3.6 | 36,000,000 | *Salmonella* | Bacteria | 8 | into the egg yolk | 0 | Bacteria |
| 10.7 | 3.6 | 36,000,000 | *Salmonella* | Bacteria | 9 | half into the egg yolk and half into the egg white | 0 | Bacteria |
| 10.7 | 3.6 | 36,000,000 | *Salmonella* | Bacteria | 10 | half into the egg yolk and half into the egg white | 0 | Bacteria |
| 10.7 | 3.6 | 36,000,000 | *Salmonella* | Bacteria | 11 | into the egg white | 0 | Bacteria |
| 10.7 | 3.6 | 36,000,000 | *Salmonella* | Bacteria | 12 | into the egg white | 0 | Bacteria |
| 10.6 | 3.6 | 3,600,000 | *Salmonella* | Bacteria | 13 | into the egg yolk | 0 | Bacteria |
| 10.6 | 3.6 | 3,600,000 | *Salmonella* | Bacteria | 14 | into the egg yolk | 0 | Bacteria |
| 10.6 | 3.6 | 3,600,000 | *Salmonella* | Bacteria | 15 | into the egg yolk and half into the egg white | 0 | Bacteria |
| 10.6 | 3.6 | 3,600,000 | *Salmonella* | Bacteria | 16 | into the egg yolk and half into the egg white | 0 | Bacteria |
| 10.6 | 3.6 | 3,600,000 | *Salmonella* | Bacteria | 17 | into the egg white | 0 | Bacteria |
| 10.6 | 3.6 | 3,600,000 | *Salmonella* | Bacteria | 18 | into the egg white | 0 | Bacteria |
| 10.5 | 3.6 | 360,000 | *Salmonella* | Bacteria | 19 | into the egg yolk | 0 | Bacteria |
| 10.5 | 3.6 | 360,000 | *Salmonella* | Bacteria | 20 | into the egg yolk | 0 | Bacteria |
| 10.5 | 3.6 | 360,000 | *Salmonella* | Bacteria | 21 | half into the egg yolk and half into the egg white | 0 | Bacteria |
| 10.5 | 3.6 | 360,000 | *Salmonella* | Bacteria | 22 | half into the egg yolk and half into the egg white | 0 | Bacteria |
| 10.5 | 3.6 | 360,000 | *Salmonella* | Bacteria | 23 | into the egg white | 0 | Bacteria |
| 10.5 | 3.6 | 360,000 | *Salmonella* | Bacteria | 24 | into the egg white | 0 | Bacteria |
| 10.4 | 3.6 | 36,000 | *Salmonella* | Bacteria | 25 | into the egg yolk | 0 | Bacteria |
| 10.4 | 3.6 | 36,000 | *Salmonella* | Bacteria | 26 | into the egg yolk | 0 | Bacteria |
| 10.4 | 3.6 | 36,000 | *Salmonella* | Bacteria | 27 | half into the egg yolk and half into the egg white | 0 | Bacteria |
| 10.4 | 3.6 | 36,000 | *Salmonella* | Bacteria | 28 | half into the egg yolk and half into the egg white | 0 | Bacteria |
| 10.4 | 3.6 | 36,000 | *Salmonella* | Bacteria | 29 | into the egg white | 0 | Bacteria |
| 10.4 | 3.6 | 36,000 | *Salmonella* | Bacteria | 30 | into the egg white | 0 | Bacteria |

Note:
(1) Quantity of bacteria that was not destroyed

The remaining results confirm the desired destruction of all bacteria

2. STUDY (determination of the change in protein and vitamin values after injection of the egg)

This study utilized eggs collected fresh daily from the same stall. The analyses were carried out by the company DÜZEN NORWEST Çevre Sağ. Hiz. Eğitim Dan.ic.Ş ti., Turkey. This analysis comprises the following steps:
a) Preparation of the eggs: 18 eggs from the same stall were made available. Of these, 9 eggs were subjected to the sterilization process. They were then cooled and delivered to the laboratory in the cooled state.
b) Analysis of the eggs: The analysis was based on the 9 eggs that were not subjected to the sterilization process and the 9 eggs that did undergo this process. The investigation took place in two separate groups. The results of the analysis are presented in the following.

Laboratory Results for Determination of the Change in Protein and Vitamin Values of Sterile Eggs

| PARAMETER | UNIT | RESULTS OF THE CHEMICAL ANALYSIS |
| --- | --- | --- |
| Protein | gr | 6.3 |
| Vitamin B1 (thiamine) | mg | 0.3 |
| Vitamin B6 (pyridoxine) | mg | 1.7 |
| Vitamin E (a-tocopherol) | mg | 1.3 |
| Vitamin B2 (riboflavin) | mg | 0.2 |
| Niacin | mg | 10 |
| Vitamin A | IU | 701.4 |
| Vitamin D | IU | <4 |
| Folic acid | mg | 0.2 |

One egg weighs 51.8 gr.

Limits of the Detection Method

Test parameters accredited by the Deutsche Akkreditierungssystem Prüfwesen (DAP, German Accreditation System for Testing). These results relate to non-sterilized eggs.

| Protein | gr | 6.3 |
| --- | --- | --- |
| Vitamin B1 (thiamine) | mg | 0.5 |
| Vitamin B6 (pyridoxine) | mg | 2.4 |
| Vitamin E (a-tocopherol) | mg | 1.5 |
| Vitamin B2 (riboflavin) | mg | 0.3 |
| Niacin | mg | 8.3 |
| Vitamin A | IU | 760 |
| Vitamin D | IU | <4 |
| Folic acid | mg | 0.1 |

One egg weighs 53.1 gr.

Limits of the Detection Method

Test parameters accredited by the Deutsche Akkreditierungssystem Prüfwesen (DAP, German Accreditation System for Testing). These results relate to sterilized eggs.

The above-noted values and parameters of the method and the device have proven particularly advantageous and expedient, in particular when the components described are used. The scope of the invention furthermore includes values and parameters which correspond, at least approximately, to the stated values and parameters for temperature, duration or pressure. Moreover, the invention also relates to embodiments wherein the values for temperature and/or duration and/or pressure exceeded or fall bellow the stated values within a range of 15%, and preferably 10%, and in particular 5%.

The method according to the invention, the device for implementing the method and the use of the device are a useful development for the destruction, rendering dormant, neutralization and restriction of the sphere of activity of newly discovered or yet-to-be discovered harmful microorganisms and viruses. It provides a foundation which can serve as a pioneer for use in the case of bacteria and viruses that are unknown today but will be discovered in the future.

The invention claimed is:

1. A method of treating eggs in shells comprising the following steps, wherein the steps in which the eggs in shells are heated are conducted in a liquid, gaseous or vaporous medium:
   preheating the eggs in shells to approximately 60° C. at a positive pressure that is at least approximately 0.4 bar over atmospheric pressure;
   then, after said preheating, shocking the eggs in shells by cooling the eggs in shells at 4 to 5° C. for a duration of 1 to 5 minutes;
   then, after said shocking, pasteurizing the eggs in shells by heating the eggs in shells at 70 to 75° C. for 10 to 20 seconds;
   then, after said pasteurizing, subjecting the eggs in shells to ultra-high temperature processing by heating the eggs in shells at 140 to 145° C. for not more than 5 seconds; and
   then, after said subjecting, shocking the eggs in shells by cooling the eggs in shells at 4 to 5° C.

2. The method of claim 1, wherein the preheating is at a positive pressure that is at least approximately 0.5 bar over atmospheric pressure.

3. The method of claim 1, wherein duration of the preheating is 14 to 16 minutes.

4. The method of claim 1, wherein the eggs in shells are vibrated during the preheating.

5. The method of claim 1, further comprising the following step:
   prior to the preheating, heating the eggs in shells at approximately 165° C. for not more than 5 seconds thereby to sterilize the shells.

6. The method of claim 5, wherein the heating at 165° C. is for a duration of approximately 2 seconds.

7. The method of claim 1, further comprising the following step:
   between the pasteurizing and the ultra-high temperature processing, heating the eggs in shells at 121 to 128° C. for 2 to 6 seconds.

8. The method of claim 7, wherein the heating between the pasteurizing and the ultra-high temperature processing is at 123 to 126° C. for 3 to 6 seconds.

9. The method of claim 8, wherein the heating between the pasteurizing and the ultra-high temperature processing is at approximately 125° C. for approximately 5 seconds.

10. The method of claim 1, wherein the pasteurizing is by heating for approximately 15 seconds.

11. The method of claim 1, wherein the ultra-high temperature processing is by heating for approximately 142° C. for approximately 2 seconds.

12. The method of claim 1, wherein the medium is in a sterilized condition at each of the steps comprising heating.

13. The method of claim 12, wherein the medium, after being used for heating eggs in shells, is resterilized for repeated use for heating eggs in shells.

14. The method of claim 1, further comprising the following steps before the pasteurizing and when the eggs in shells are at 4 to 5° C.:
   washing the eggs in shells with water at at least 40° C.; and
   rinsing the eggs with water at at least about 43° C.

15. The method of claim 14, further comprising the following step:

after the rinsing and before the pasteurization, drying the eggs in shells.

16. The method of claim 1, wherein at least one of the pasteurizing and ultra-high temperature processing is at a predetermined positive pressure.

17. The method of claim 16, wherein the predetermined positive pressure is a positive pressure that is 0.4 to 7 bar over atmospheric pressure.

18. The method of claim 17, wherein the predetermined positive pressure is a positive pressure that is 0.5 to 1 bar over atmospheric pressure.

19. A method of treating eggs in shells comprising the following steps, wherein the steps in which the eggs in shells are heated are conducted in a liquid, gaseous or vaporous medium:
   preheating the eggs in shells to approximately 60° C. at a positive pressure that is least approximately 0.4 bar over atmospheric pressure;
   then, after said preheating, shocking the eggs in shells by cooling the eggs in shells at 4 to 5° C. for a duration of 2 minutes;
   then, after said shocking, pasteurizing the eggs in shells by heating the eggs in shells at 70 to 75° C. for 10 to 20 seconds;
   then, after said pasteurizing, subjecting the eggs in shells to ultra-high temperature processing by heating the eggs in shells at 140 to 145° C. for not more than 5 seconds; and
   then, after said subjecting, shocking the eggs in shells by cooling the eggs in shells at 4 to 5° C.

\* \* \* \* \*